United States Patent
Adriaansz

(10) Patent No.: US 7,162,010 B2
(45) Date of Patent: Jan. 9, 2007

(54) METHOD TO MEASURE THE ENTRANCE DOSE OF A RADIOLOGY APPARATUS

(75) Inventor: Matthijs Adriaansz, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 277 days.

(21) Appl. No.: 10/497,342

(22) PCT Filed: Dec. 2, 2002

(86) PCT No.: PCT/IB02/05097

§ 371 (c)(1),
(2), (4) Date: Jun. 1, 2004

(87) PCT Pub. No.: WO03/048806

PCT Pub. Date: Jun. 12, 2003

(65) Prior Publication Data

US 2004/0258205 A1    Dec. 23, 2004

(30) Foreign Application Priority Data

Dec. 5, 2001    (EP) .................................. 01204681

(51) Int. Cl.
*H05G 1/42*    (2006.01)
*H05G 1/44*    (2006.01)
*H05G 1/20*    (2006.01)
*H01B 15/02*    (2006.01)

(52) U.S. Cl. .................... 378/97; 378/54; 378/108; 378/95

(58) Field of Classification Search ................ 378/4, 378/19, 53–56, 98.7, 98.8, 108, 196, 197, 378/208, 95, 97, 51, 54

See application file for complete search history.

(56) References Cited

U.S. PATENT DOCUMENTS

| | | | | |
|---|---|---|---|---|
| 4,158,138 A | * | 6/1979 | Hellstrom | 378/116 |
| 4,590,603 A | * | 5/1986 | Relihan et al. | 378/108 |
| 4,703,496 A | * | 10/1987 | Meccariello et al. | 378/98.7 |
| 6,094,468 A | * | 7/2000 | Wilting et al. | 378/8 |
| 6,222,907 B1 | * | 4/2001 | Gordon, III et al. | 378/116 |

\* cited by examiner

*Primary Examiner*—Edward J. Glick
*Assistant Examiner*—Irakli Kiknadze

(57) ABSTRACT

The invention relates to a method to measure the entrance dose of a radiology apparatus of the type comprising an X-ray beam source, and a detector for the X-ray beam after it has passed an object of interest carried on a table placed between the source and the detector, wherein the X-ray beam source is placed above said table and wherein the distance between the X-ray beam source and the object is estimated taking into account the object's morphology, for determining said entrance dose. An attenuation-ratio is calculated depending on energy-levels of the X-ray beam leaving the X-ray beam source and arriving at the detector respectively, and that the object's thickness is calculated depending on said attenuation-ratio, said thickness together with the table-position defining said distance between the X-ray beam source and the object.

6 Claims, 1 Drawing Sheet

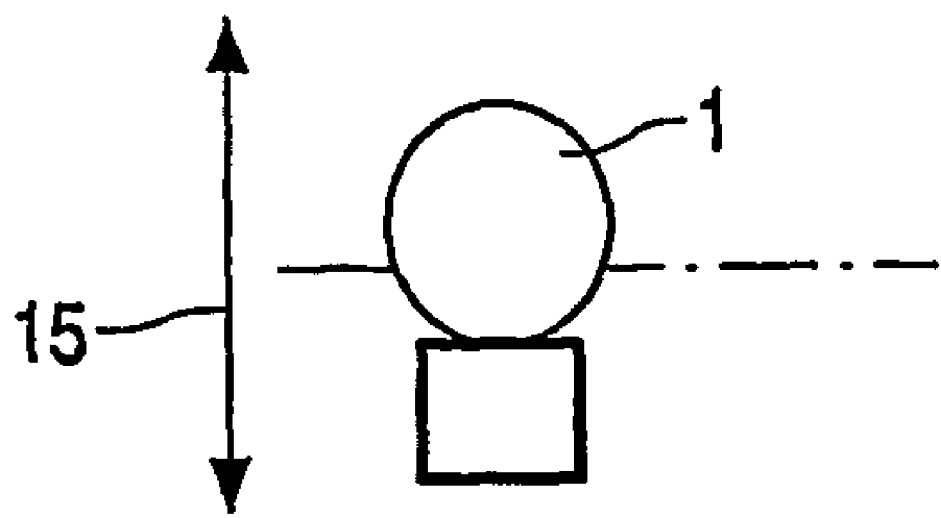
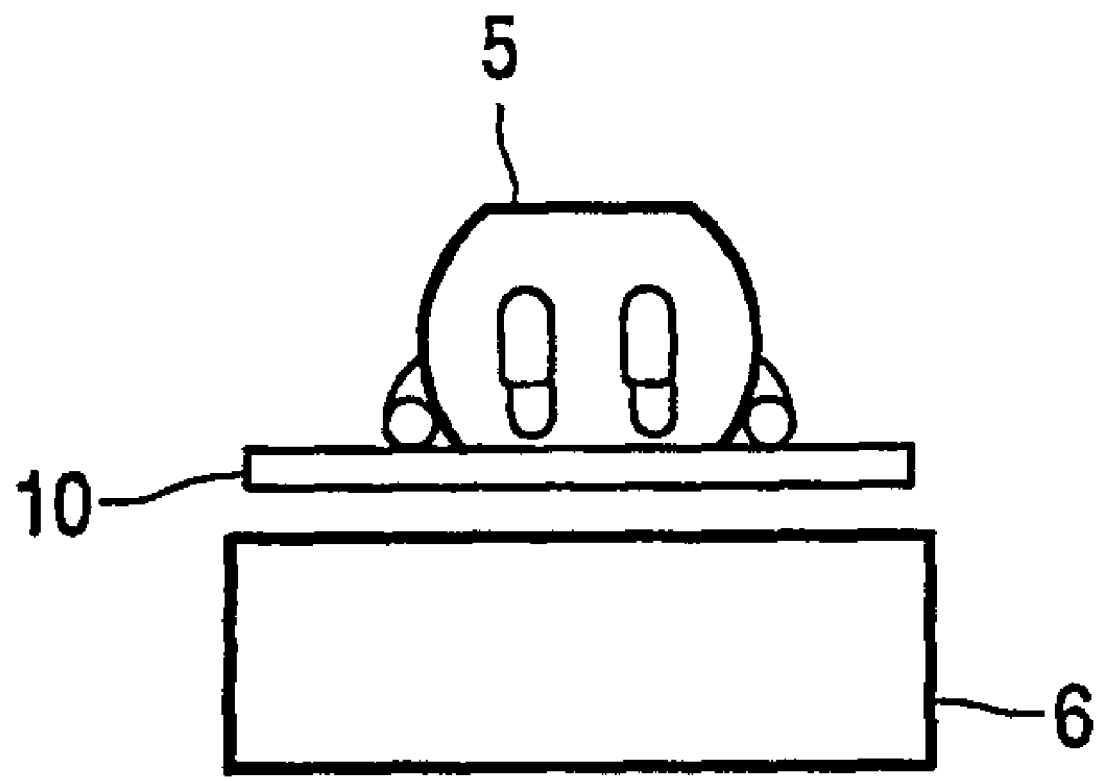

METHOD TO MEASURE THE ENTRANCE DOSE OF A RADIOLOGY APPARATUS

The invention relates to a method to measure the entrance dose of a radiology apparatus of the type comprising an X-ray beam source, and a detector for the X-ray beam after it has passed an object of interest carried on a table placed between the source and the detector, wherein the X-ray beam source is placed above said table, and wherein the distance between the X-ray beam source and the object is estimated taking into account the object's morphology, for determining said entrance dose.

Such a method is known from EP-A-1 035 420.

With such a method it is intended to derive an accurate value of the actual X-ray dose received by the object, usually a patient. The importance hereof is self-evident.

The invention aims to provide a simple, yet reliable method to take the object's morphology into account for determining said entrance dose.

In this respect the method according to the invention is characterized in that an attenuation-ratio is calculated depending on energy-levels of the X-ray beam leaving the X-ray beam source and arriving at the detector respectively, and that the object's thickness is calculated depending on said attenuation-ratio, said thickness together with the table-position defining said distance between the X-ray beam source and the object.

Once the source to object distance is known, the entrance dose of the X-ray beam arriving at the patient can easily be calculated in accordance with applicable methods known from the prior art.

The ease of calculating the entrance dose of the X-ray beam arriving at the patient is supported by the measure that the energy-level of the X-ray beam leaving the X-ray beam source is calculated with a model-description of said X-ray beam source. Such a model description of the X-ray beam source is known per se from the prior art such as for instance U.S. Pat. No. 4,158,138.

It is preferable that the object's thickness is calculated depending on the attenuation-ratio, and further taking into account at least a first correction factor pertaining to the region of interest of the concerning object. In this manner the determination of the object's thickness can be maintained at the required level of accuracy, although the investigated part of the patient more than moderately deviates from the normally investigated waterlike tissue of such patient. In this way also head, chest and pelvis may be suitably investigated.

It is further preferred that in calculating the object's thickness a second correction factor is used relating to ageing effects of the X-ray beam source. This may be implemented in line with regular calibrations of the concerning radiology apparatus that is used.

Of course, special precautions have to be taken in the case of application of shutters, wedges and filters. When these objects get into the measuring field, their position and attenuation-values must be known and consequently taken into account when deriving the patient's thickness. Special precautions should be taken to prevent unnoticed application of external filters in the filter holding slits of the collimator housing of the apparatus.

The invention also relates to a radiology apparatus. The radiology apparatus according to the invention as defined in claim 5 is able to operate according to the method of the invention. The invention also pertain to a computer programme. The computer programme according to the invention is defined in claim 6. When the computer programme of the invention is loaded into the working memory of a processor that is comprised in a radiology apparatus to control the operation of the radiology apparatus, this enables the radiology apparatus to carry out the method of the invention.

The invention will hereafter be further elucidated with reference to the drawing showing a single FIGURE.

The FIGURE is a schematic view of a radiology apparatus used in the method of the invention.

FIG. 1 shows that the radiology apparatus comprises an X-ray beam source 1 which is movable in height as shown by arrow 15.

The X-ray beam source 1 is placed above a table 10 on which a person 5 who is to be monitored is lying. Under the table 10 detector 6 is placed for receiving the X-ray beam transmitted by the X-ray beam source 1 after it has passed the body of the person 5.

In order to measure the entrance dose at the skin of the person 5 an attenuation-ratio is calculated that depends on the energy-levels of the X-ray beam leaving the X-ray beam source 1 and arriving at the detector 6 respectively.

Said attenuation-ratio is used to estimate the person's 5 thickness and this thickness together with the actual position of the table 10 vis-à-vis the X-ray beam source 1 is used to determine the distance between the X-ray beam source 1 and the person 5.

Obviously the apparatus as shown in FIG. 1 can also be implemented such that the X-ray beam source 1 is stationery and that the table 10 can be moved in the vertical direction to a certain desired height level.

In a preferred embodiment of the invention the energy-level of the X-ray beam leaving the X-ray beam source 1 is calculated with a predetermined model description of the X-ray beam source 1.

It is further preferred that depending on the part of the body of the person 5 that is being monitored a correction factor is applied in the derivation of the person's 5 thickness depending on the measured attenuation-ratio.

Furthermore, it is desirable that a second correction factor is used to take into account ageing effects of the X-ray beam source 1.

The invention claimed is:

1. A method for measuring an entrance dose received by an object having a thickness, the method taking into consideration the object's morphology, the entrance dose being delivered by a radiology apparatus of the type comprising an X-ray beam source and a detector for the X-ray beam, the method comprising the steps of:
   placing the object on a surface between the source and the detector,
   calculating an attenuation-ratio by determining energy-levels of an X-ray beam leaving the X-ray beam source and arriving at the detector respectively,
   calculating a distance between the X-ray beam source and the object to obtain a source to object distance, the distance calculation comprising a step of calculating the object's thickness based upon the attenuation-ratio and a step of defining a surface-position of the object, and
   employing the source to object distance to calculate the entrance dose of the X-ray beam arriving at the object.

2. The method according to claim 1, wherein the step of calculating an attenuation-ratio further comprises a step of determining the energy-level of the X-ray beam source with a model-description of the X-ray beam source.

3. The method according to claim 1, wherein the step of calculating the object's thickness further comprises a step of employing at least a first correction factor pertaining to a region of interest of the object.

4. The method according to claim 1, wherein the step of calculating the object's thickness further comprises a step of employing a second correction factor relating to ageing effects of the X-ray beam source.

5. A radiology apparatus comprising:
an X-ray beam source,
a detector,
a surface disposed between the source and the detector, and
a computation unit for determining an entrance dose received by an object disposed on the surface taking into account the object's morphology, the computation unit being arranged to estimate a distance between the X-ray beam source and the object, to calculate an attenuation-ratio depending on energy-levels of an X-ray beam leaving the X-ray beam source and arriving at the detector respectively, and to calculate a thickness of the object based on the attenuation-ratio together with a surface-position, thereby defining said distance between the X-ray beam source and the object.

6. A computer-readable storage medium storing a program for causing a computer to perform having instructions for estimating a distance between an X-ray beam source and an object placed on a surface taking into account the object's morphology, the program having means for determining an entrance dose received by the object, a means for calculating an attenuation-ratio by determining energy-levels of an X-ray beam leaving the X-ray beam source and arriving at the detector respectively, and a means for calculating the object's thickness depending on the attenuation-ratio, the thickness together with surface-position determining the distance between the X-ray beam source and the object.

* * * * *